United States Patent Office 3,420,880
Patented Jan. 7, 1969

3,420,880
OXIDATION OF ALDEHYDES WITH A PALLADOUS SALT, A COPPER SALT AND OXYGEN IN THE PRESENCE OF WATER OR CARBOXYLATE IONS
Duncan Clark and Percy Hayden, Norton-on-Tees, England, assignors to Imperial Chemical Industries Limited, London, England, a corporation of Great Britain
No Drawing. Filed Feb. 11, 1965, Ser. No. 431,966
Claims priority, application Great Britain, Feb. 13, 1964, 6,094/64
U.S. Cl. 260—530    6 Claims
Int. Cl. C07c 51/26

ABSTRACT OF THE DISCLOSURE

Acrolein, methacrolein, crotonaldehyde, cyclohexene-1-aldehyde or cinnamaldehyde is oxidized to the corresponding unsaturated acid by reaction with oxygen in a liquid reaction mixture containing also a palladium salt, a copper salt and either water or carboxylate ions.

---

This invention relates to a process for the production of acids, in which an unsaturated aldehyde is oxidized to the corresponding unsaturated carboxylic acid.

The unsaturated aldehydes to which the invention is applicable have the general formula:

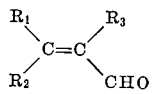

in which each of $R_1$, $R_2$ and $R_3$ is a hydrogen atom or an aryl or saturated alkyl group or $R_1$ and $R_3$ are combined as a divalent saturated alkyl group.

Processes for the oxidation of such unsaturated aldehydes to the corresponding acids are already known but such processes have usually entailed the use of such catalysts and reaction conditions as encourage the polymerization of the unsaturated materials present. It is therefore an object of the present invention to provide an alternative and novel process for this oxidation in which the tendency to polymerize is reduced or eliminated.

The process according to the present invention comprises contacting an unsaturated aldehyde of the formula:

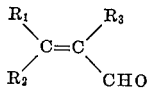

wherein the symbols $R_1$, $R_2$ and $R_3$ have the meaning stated above, with a palladium salt, in the presence of molecular oxygen, a salt of copper or iron, and a nucleophile which is water or carboxylate ions.

The unsaturated aldehydes which may be used in the process and which must satisfy the general formula given above include acrolein (when $R_1$, $R_2$ and $R_3$ are all hydrogen atoms), methacrolein (when $R_1$ and $R_2$ are hydrogen and $R_3$ is a methyl group), crotonaldehyde (when $R_2$ and $R_3$ are hydrogen and $R_1$ is a methyl group), cyclohexene-1-aldehyde (when $R_2$ is hydrogen and $R_1$ and $R_3$ are combine as a tetramethylene group —$C_4H_8$—) and cinnamaldehyde (when $R_1$ is a phenyl group and $R_2$ and $R_3$ are hydrogen). The invention is of particular interest as a means of converting acrolein or methacrolein into acrylic acid or methacrylic acid respectively, which acids in turn are particularly useful in the form of their esters the acrylates and methacrylates.

The palladium salt selected for use in the process according to the invention may advantageously be the acetate or another carboxylate (for example the carboxylate which corresponds to the carboxylate ions which may be present during the reaction) or a halide. The chloride is particularly preferred but palladous bromide is also useful. The concentration of the palladium salt in the reaction mixture is normally fairly small and preferably lies in the range of $5 \times 10^{-4}$ to 0.5 molar, especially in the range of $5 \times 10^{-3}$ to 0.1 molar.

The molecular oxygen may be introduced to the reaction in the form of the pure gas, or in admixture with an unreactive gas, for example with nitrogen. Thus it may be introduced to the reaction as air. It may be passed through the reaction solution either continuously or intermittently.

The salt of copper or iron which is present during the reaction functions, in the form of salts of the metal in its two different valency states, as a redox system. For example the redox system may consist of cupric and cuprous ions, or ferric and ferrous ions. Suitable salts include those of an acid of which the carboxylate ions may be present during the reaction. For example, if the reaction is carried out in the presence of acetate ions, then the selected copper salt may be cupric acetate. Also suitable are the halides, especially cupric chloride and the bromides.

The concentration of the salt of copper or iron in the reaction mixture preferably lies in the range of 0.05 to 0.5 molar, especially in the range of 0.1 to 0.3 molar.

Either water or carboxylate ions, or both, are present during the reaction. The water may amount to only a small proportion of the reaction medium or it may be used as the sole liquid component of the reaction mixture. However, when water is present, it is usually desirable to have a second liquid present, especially a liquid in which one or more of the reactants is soluble. Thus the reaction medium may contain, in addition to water, a second liquid selected from the group consisting of acetic acid, acetate esters including methyl and benzyl acetates, dimethyl acetamide, dimethyl sulphoxide, tetramethylene sulphone and 3:4-dimethyl tetramethylene sulphone. For example the other reactants may be dissolved in a liquid medium consisting of 10 percent of water and 90 percent of acetic acid or consisting of equal proportions of water and acetic acid. Liquids selected from the above group may also, singly or in any combination, be used as the reaction medium when no water is present.

If water is not present during the reaction then it is necessary to introduce carboxylate ions into the reaction mixture. Thus a metal carboxylate which is ionizable under the reaction conditions may be incorporated in the reaction mixture. The carboxylate may be of an alkali metal, for example lithium, sodium or potassium, of an alkaline earth metal, for example magnesium, calcium or barium, or of copper. It may, if desired, be an acetate or a propionate or a salt of an acid of higher molecular weight than this, for example of hexanoic acid. It may be of an aliphatic or aromatic, mono- or di-carboxylic acid. The carboxylate may advantageously correspond to an acid already present in the reaction mixture; thus if the reactants are dissolved wholly or partly in acetic acid, then the carboxylate may be sodium acetate. The carboxylate may also be prepared in situ, for example by adding a carbonate such as sodium carbonate to a reaction mixture containing a carboxylic acid. In yet another form of the process, the carboxylate ions may be introduced simultaneously with the redox system or with the palladium salt, by using say cupric acetate or palladous acetate respectively.

If carboxylate ions are to be present during the reaction, then it is preferred that their minimum concentration be at least 0.1 molar and advantageously at least molar, for example up to 4 molar. Thus a typical concentration might be about 2 molar.

It is advantageous to have chloride or bromide ions also present during the reaction. For example, chloride ions may be introduced with the redox system as cupric chloride or with the palladium salt by using palladous chloride. However, it is preferred to add the chloride ions in the form of a chloride salt in addition to any chosen for the redox system or as the palladium salt. Thus an alkali metal chloride, for example sodium, lithium or potassium chloride, an alkaline earth metal chloride, for example magnesium or calcium chloride, or a copper chloride may be incorporated in the reaction mixture.

The total concentration of halide ions in the reaction mixture is preferably fairly low when the reaction is carried out in a carboxylic acid as solvent, say not more than 0.35 molar. When another liquid solvent, for example dimethyl acetamide, is used, higher halide ion concentrations are acceptable, for example up to about 2 molar. However, the preferred maximum concentration depends on several factors, including the cations present, the concentration of the unsaturated aldehyde and the concentration of any carboxylate ions which may be present. It also depends upon the presence or absence of water in that increasing proportions of water in the reaction make higher concentrations of the halide ions practicable. By way of example, if both lithium chloride and lithium acetate are present and the reaction is carried out in acetic acid as solvent, then the chloride or bromide ion concentration is preferably below 0.2 molar while, using the corresponding potassium salts, concentrations below 0.25 molar are preferred; in particular, we prefer to employ halide ion concentrations below 0.1 molar.

By way of further example, if the reaction is carried out in dimethyl acetamide as solvent, the preferred halide ion concentration will in general lie below 0.5 molar.

The unsaturated aldehyde used as the starting material in the present process may amount to a high proportion of the reaction mixture, say as high as 95 percent by weight, but it is preferred that the proportion be not greater than 50 percent. In general the proportion should not be so great as to render insoluble any of the inorganic components of the reaction mixture.

The reaction proceeds satisfactorily at all temperatures from the melting point of the reaction mixture up to 200° C., although we prefer to use temperatures lying in the range of 50° to 150° C., especially between 80° and 130° C.

The reaction may be carried out at atmospheric pressure but it is advantageous to use elevated pressures, which may be as high as 200 atmospheres. The preferred pressures lie in the range from atmospheric pressure up to 50 atmospheres.

While the reaction mixture will often be acidic simply from the presence of, say, acetic acid as part or all of the reaction medium, in other circumstances it is advantageous to ensure deliberately that the pH value of the reaction mixture lies on the acidic side of pH 7. For example, the pH value may be below pH 3.

In order to encourage the formation of the unsaturated acid in high yields, the latter is preferably removed from the reaction mixture as soon as possible after it has been produced. To this end, high gas rates through the mixture are desirable. Thus it is preferred to use a gas flow rate of 200 to 2000 litres (measured at atmospheric pressure) of gas per litre of liquid reaction mixture per hour.

In general, the unsaturated acid may be removed from the reaction mixture and ultimately purified by any of the usual methods. For example, acrylic acid may be separated by distillation or by solvent extraction.

The unsaturated acids obtained by the process according to the present invention are useful as intermediates, especially in the production of corresponding esters such as methyl acrylate and methyl methacrylate, which find very wide application in the form of their polymers in the synthetic resin field.

The invention will now be further described by means of the following examples:

EXAMPLE 1

Oxygen was introduced at atmospheric pressure continuously over a period of about 50 minutes into a reaction solution at a temperature of 55° C. The solution, which had been made up to a volume of 100 cc.'s with glacial acetic acid, contained 10 cc.'s of water and also the following components at the specified concentrations:

|  | Molar |
|---|---|
| Palladium chloride | .03 |
| Lithium chloride | .03 |
| Total chloride | .09 |
| Lithium acetate | 2.0 |
| Cupric acetate | .15 |
| Total acetate | 2.30 |
| Acrolein | 2.0 |

The product mixture contained about $7 \times 10^{-3}$ moles of acrylic acid and it appeared that further reaction gave no more of this product. It is believed that at this stage the acrylic acid was being converted further by a second reaction which probably involved addition of acetic acid or water across the double bond, to give $\beta$-acetoxy-propionic acid or $\beta$-hydroxy-propionic acid respectively.

EXAMPLE 2

Oxygen was introduced at atmospheric pressure continuously over a period of 120 minutes into a reaction solution at a temperature of 55° C. The solution consisted of 100 cc.'s of dimethyl acetamide, 10 cc.'s of water and the following components at the specified concentrations:

|  | Molar |
|---|---|
| Palladium chloride | .053 |
| Lithium chloride | .10 |
| Cupric chloride | .26 |
| Total chloride | .726 |
| Acrolein | .525 |

It was observed that the reaction did not begin until the water was added to the reaction solution.

The product mixture contained $1.5 \times 10^{-2}$ moles of acrylic acid.

EXAMPLE 3

Oxygen was introduced at atmospheric pressure continuously at a rate of 20 liters/hour over a period of 30 minutes into a reaction solution at a temperature of 70° C.

The reaction solution consisted of:

| | | |
|---|---|---|
| Palladium chloride | molar | .01 |
| Lithium chloride | do | 0.1 |
| Total chloride | do | 0.12 |
| Lithium acetate | do | 2.0 |
| Cupric acetate | do | 0.15 |
| Total acetate | do | 2.30 |
| Acrolein | moles | 0.1 |

Glacial acetic acid to 100 ccs.

The product mixture contained $10^{-2}$ moles of acrylic acid.

We claim:
1. A process for the production of unsaturated acids which comprises passing a gas containing molecular oxygen, at a pressure between atmospheric pressure and 200 atmospheres, into a liquid reaction medium, at a temperature between the melting point of the reaction mixture and 200° C. containing:
   (a) an unsaturated aldehyde selected from the group consisting of acrolein, methacrolein, crotonaldehyde, cyclohexene-1-aldehyde and cinnamaldehyde; and

(b) a nucleophile medium selected from the group consisting of carboxylate ions and water and mixtures thereof, and wherein the carboxylate ions are derived from carboxylates of lower saturated aliphatic carboxylic acids and are ionizable under the reaction conditions, said carboxylate ions being present in a concentration of about 0.1 to 4 molar; and (c) a palladium salt selected from the group consisting of the carboxylates, chlorides and bromides in a concentration from about $5 \times 10^{-4}$ to 0.5 molar, and wherein the palladium carboxylates correspond to the said caboxylates of (b); and (d) a redox system comprising a copper salt selected from the group consisting of the carboxylates, chlorides and bromides in a concentration of about 0.05 to 0.5 molar, and wherein the copper carboxylates correspond to the said carboxylates of (b).

2. The process of claim 1 wherein the nucleophile medium also contains a liquid selected from the group consisting of acetic acid, acetate esters, dimethyl acetamide, dimethyl sulphoxide, tetramethylene sulphone and 3:4-dimethyl tetramethylene sulphone.

3. A process according to claim 1, wherein the liquid reaction mixture also contains halide ions provided by incorporating in said mixture a halide selected from the group consisting of alkali metal and alkaline earth metal chlorides and bromides.

4. A process for producing unsaturated acids which comprises passing a gas containing molecular oxygen, at a pressure between atmospheric pressure and 200 atmospheres, into a liquid reaction mixture at a temperature of 50° to 150° C. and containing:

(a) an unsaturated aldehyde selected from the group consisting of acrolein, methacrolein and crotonaldehyde;

(b) a palladium salt selected from the group consisting of palladous acetate, chloride and bromide, in a concentration from $5 \times 10^{-4}$ to 0.5 molar;

(c) a copper salt selected from the group consisting of cupric acetate, chloride and bromide, in a concentration from 0.05 to 0.5 molar; and (d) an alkali metal acetate in a concentration of 0.1 to 4.0 molar.

5. A process according to claim 4, wherein the rate of flow of said gas into said liquid reaction mixture lies in the range of 200 to 2000 liters (measured at atmospheric pressure) per liter of said liquid reaction mixture per hour.

6. A process according to claim 4, wherein said liquid reaction mixture contains an alkali metal chloride in a concentration up to 0.35 molar.

References Cited

UNITED STATES PATENTS 2,212,900   8/1940   Groll et al. _____ 260—530

FOREIGN PATENTS 904,304   8/1962   Great Britain.

LORRAINE A. WEINBERGER, *Primary Examiner.*

VIVIAN GARNER, *Assistant Examiner.*

U.S. Cl. X.R.

260—514, 523, 488, 535